US008880587B2

(12) United States Patent
Cobb et al.

(10) Patent No.: US 8,880,587 B2
(45) Date of Patent: Nov. 4, 2014

(54) SYSTEM AND METHOD FOR DELIVERY OF CONTENT OBJECTS

(75) Inventors: Jonathan Cobb, Piedmont, CA (US); David Rowley, Benicia, CA (US); Scott Anderson, San Francisco, CA (US); Abbas Mahyari, Newark, CA (US); Nikita Dolgov, Concord, CA (US); Carl Rivas, San Francisco, CA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 12/756,956

(22) Filed: Apr. 8, 2010

(65) Prior Publication Data

US 2011/0252082 A1    Oct. 13, 2011

(51) Int. Cl.
| | | |
|---|---|---|
| G06F 15/16 | (2006.01) |
| G06F 17/30 | (2006.01) |
| H04L 29/06 | (2006.01) |
| H04L 29/08 | (2006.01) |

(52) U.S. Cl.
CPC .......... *H04L 65/605* (2013.01); *G06F 17/3089* (2013.01); *H04L 65/4076* (2013.01); *H04L 67/303* (2013.01); *H04L 65/4084* (2013.01)
USPC ........... 709/203; 709/232; 709/227; 709/230; 709/234; 709/237

(58) Field of Classification Search
USPC .................. 709/203, 232, 227, 230, 234, 237
See application file for complete search history.

(56) References Cited

U.S. PATENT DOCUMENTS

| 4,466,063 | A | * | 8/1984 | Segarra et al. ................ 709/226 |
| 5,995,756 | A | * | 11/1999 | Herrmann ..................... 717/178 |
| 5,996,022 | A | * | 11/1999 | Krueger et al. ............... 709/247 |
| 5,999,525 | A | * | 12/1999 | Krishnaswamy et al. .... 370/352 |

(Continued)

FOREIGN PATENT DOCUMENTS

| EP | 1309153 A1 | 5/2003 |
| KR | 10-2003-0055645 A | 7/2003 |

(Continued)

OTHER PUBLICATIONS

Carson; iPhone HTTP streaming with FFMpeg and an Open Source Segmenter; Jun. 28, 2009; Ion Cannon; 8 Pages.*

(Continued)

*Primary Examiner* — Randy Scott
*Assistant Examiner* — Anthony Fabbri
(74) *Attorney, Agent, or Firm* — Kilpatrick Townsend & Stockton LLP

(57) ABSTRACT

Techniques for delivering content to an end user device are disclosed. A policy server performs an ingest process in which multiple versions of a content object are created. The multiple versions of the content object are associated with a single network identifier which can be distributed to publishers of the content object. When the content object is requested using the single network identifier, the policy server determines a preferred version and delivery orchestration scheme from among the multiple versions for delivery to an end user device based on several criteria. The policy server may thereafter orchestrate delivery of the preferred version of the content object to the end user device. The single network identifier may be associated with an edge location in a content delivery network (CDN) and the policy server may orchestrate delivery in cooperation with servers at the CDN edge location.

22 Claims, 12 Drawing Sheets

(56) References Cited

U.S. PATENT DOCUMENTS

| | | | | |
|---|---|---|---|---|
| 6,052,737 A * | 4/2000 | Bitton et al. | | 709/248 |
| 6,094,677 A * | 7/2000 | Capek et al. | | 709/219 |
| 6,112,228 A * | 8/2000 | Earl et al. | | 709/205 |
| 6,119,165 A * | 9/2000 | Li et al. | | 709/229 |
| 6,141,681 A * | 10/2000 | Kyle | | 709/206 |
| 6,163,859 A * | 12/2000 | Lee et al. | | 714/38.14 |
| 6,195,696 B1 * | 2/2001 | Baber et al. | | 709/223 |
| 6,310,889 B1 * | 10/2001 | Parsons et al. | | 370/466 |
| 6,347,398 B1 * | 2/2002 | Parthasarathy et al. | | 717/178 |
| 6,370,588 B2 * | 4/2002 | Gebauer | | 709/246 |
| 6,400,958 B1 * | 6/2002 | Isomursu et al. | | 455/466 |
| 6,421,726 B1 * | 7/2002 | Kenner et al. | | 709/225 |
| 6,546,554 B1 * | 4/2003 | Schmidt et al. | | 717/176 |
| 6,563,517 B1 * | 5/2003 | Bhagwat et al. | | 715/735 |
| 6,635,089 B1 * | 10/2003 | Burkett et al. | | 715/235 |
| 6,637,020 B1 * | 10/2003 | Hammond | | 717/107 |
| 6,640,238 B1 * | 10/2003 | Bowman-Amuah | | 709/201 |
| 6,687,737 B2 * | 2/2004 | Landsman et al. | | 709/203 |
| 6,708,166 B1 * | 3/2004 | Dysart et al. | | 707/765 |
| 6,742,015 B1 * | 5/2004 | Bowman-Amuah | | 718/101 |
| 6,779,035 B1 * | 8/2004 | Gbadegesin | | 709/228 |
| 6,832,241 B2 * | 12/2004 | Tracton et al. | | 709/203 |
| 6,891,802 B1 * | 5/2005 | Hubbard | | 370/241 |
| 6,917,937 B1 * | 7/2005 | Rubendall | | 1/1 |
| 6,934,740 B1 * | 8/2005 | Lawande et al. | | 709/213 |
| 6,947,063 B1 * | 9/2005 | Cirulli et al. | | 715/851 |
| 6,952,714 B2 * | 10/2005 | Peart | | 709/203 |
| 6,981,212 B1 * | 12/2005 | Claussen et al. | | 715/205 |
| 7,000,013 B2 * | 2/2006 | Mei et al. | | 709/223 |
| 7,016,964 B1 * | 3/2006 | Still et al. | | 709/229 |
| 7,065,707 B2 * | 6/2006 | Chen et al. | | 715/234 |
| 7,127,503 B2 * | 10/2006 | Malrnskog | | 709/219 |
| 7,203,901 B2 * | 4/2007 | Chen et al. | | 715/205 |
| 7,231,420 B2 * | 6/2007 | Bach Corneliussen | | 709/203 |
| 7,263,562 B2 * | 8/2007 | De Vorchik et al. | | 709/246 |
| 7,293,095 B2 * | 11/2007 | Gbadegesin | | 709/227 |
| 7,308,649 B2 * | 12/2007 | Ehrich et al. | | 715/235 |
| 7,356,575 B1 * | 4/2008 | Shapiro | | 709/220 |
| 7,426,546 B2 * | 9/2008 | Breiter et al. | | 709/219 |
| 7,433,935 B1 * | 10/2008 | Obert | | 709/219 |
| 7,480,700 B2 * | 1/2009 | Gautier et al. | | 709/217 |
| 7,505,936 B2 | 3/2009 | Huffman et al. | | |
| 7,590,711 B2 * | 9/2009 | Lord et al. | | 709/219 |
| 7,636,768 B2 * | 12/2009 | Yang et al. | | 709/219 |
| 7,664,872 B2 * | 2/2010 | Osborne et al. | | 709/232 |
| 8,074,229 B2 | 12/2011 | Brunswig et al. | | |
| 8,266,204 B2 | 9/2012 | Bansal et al. | | |
| 8,577,961 B2 * | 11/2013 | Rezaiifar | | 709/203 |
| 2001/0029525 A1 * | 10/2001 | Lahr | | 709/218 |
| 2001/0037389 A1 * | 11/2001 | Fujimori et al. | | 709/225 |
| 2001/0047428 A1 * | 11/2001 | Hunter | | 709/245 |
| 2001/0056444 A1 * | 12/2001 | Ide et al. | | 707/513 |
| 2002/0056010 A1 * | 5/2002 | Lincoln et al. | | 709/247 |
| 2002/0091848 A1 * | 7/2002 | Agresta et al. | | 709/231 |
| 2002/0099798 A1 * | 7/2002 | Fedorovsky et al. | | 709/219 |
| 2002/0099829 A1 * | 7/2002 | Richards et al. | | 709/227 |
| 2002/0116518 A1 * | 8/2002 | Silen et al. | | 709/231 |
| 2002/0138588 A1 * | 9/2002 | Leeds | | 709/217 |
| 2002/0156702 A1 * | 10/2002 | Kane | | 705/27 |
| 2003/0014630 A1 * | 1/2003 | Spencer et al. | | 713/168 |
| 2003/0018950 A1 * | 1/2003 | Sparks et al. | | 717/100 |
| 2003/0069991 A1 * | 4/2003 | Brescia | | 709/245 |
| 2003/0084425 A1 * | 5/2003 | Glaser | | 717/110 |
| 2003/0101434 A1 * | 5/2003 | Szyperski | | 717/120 |
| 2003/0110234 A1 | 6/2003 | Egli et al. | | |
| 2003/0167334 A1 * | 9/2003 | Butler | | 709/227 |
| 2003/0177477 A1 * | 9/2003 | Fuchs | | 717/136 |
| 2003/0225836 A1 * | 12/2003 | Lee et al. | | 709/205 |
| 2004/0019497 A1 * | 1/2004 | Volk et al. | | 705/1 |
| 2004/0073596 A1 * | 4/2004 | Kloninger et al. | | 709/200 |
| 2004/0093396 A1 * | 5/2004 | Akune | | 709/219 |
| 2004/0205172 A1 * | 10/2004 | Kim | | 709/222 |
| 2004/0236795 A1 * | 11/2004 | Johnston | | 707/200 |
| 2004/0267912 A1 * | 12/2004 | Kim | | 709/220 |
| 2005/0010653 A1 * | 1/2005 | McCanne | | 709/219 |
| 2005/0044527 A1 * | 2/2005 | Recinto | | 717/109 |
| 2005/0049886 A1 * | 3/2005 | Grannan et al. | | 705/1 |
| 2005/0071806 A1 * | 3/2005 | Sreedhar | | 717/104 |
| 2005/0073964 A1 * | 4/2005 | Schmidt et al. | | 370/260 |
| 2005/0119977 A1 * | 6/2005 | Raciborski | | 705/59 |
| 2005/0131971 A1 * | 6/2005 | James et al. | | 707/205 |
| 2005/0289535 A1 * | 12/2005 | Murray et al. | | 717/172 |
| 2006/0036570 A1 * | 2/2006 | Schaefer et al. | | 707/1 |
| 2006/0055963 A1 * | 3/2006 | Otsuka et al. | | 358/1.15 |
| 2006/0059416 A1 * | 3/2006 | Lin | | 715/501.1 |
| 2006/0143247 A1 * | 6/2006 | Poole et al. | | 707/204 |
| 2006/0174190 A1 * | 8/2006 | Gomes et al. | | 715/511 |
| 2006/0212843 A1 * | 9/2006 | Zaky et al. | | 717/106 |
| 2007/0113225 A1 * | 5/2007 | Felts | | 717/172 |
| 2007/0118667 A1 * | 5/2007 | McCarthy et al. | | 709/238 |
| 2007/0186006 A1 * | 8/2007 | Murray | | 709/231 |
| 2008/0072264 A1 * | 3/2008 | Crayford | | 725/86 |
| 2008/0091792 A1 * | 4/2008 | Mei et al. | | 709/217 |
| 2008/0091808 A1 * | 4/2008 | Mei et al. | | 709/223 |
| 2008/0091845 A1 * | 4/2008 | Mills et al. | | 709/246 |
| 2008/0127289 A1 * | 5/2008 | Julia et al. | | 725/109 |
| 2008/0162670 A1 * | 7/2008 | Chapweske et al. | | 709/219 |
| 2009/0013063 A1 * | 1/2009 | Soman | | 709/223 |
| 2009/0049502 A1 * | 2/2009 | Levien et al. | | 725/136 |
| 2009/0106447 A1 * | 4/2009 | Lection | | 709/236 |
| 2009/0298478 A1 * | 12/2009 | Tyhurst et al. | | 455/414.1 |
| 2010/0223364 A1 | 9/2010 | Wei | | |
| 2010/0229108 A1 | 9/2010 | Gerson et al. | | |
| 2011/0078333 A1 | 3/2011 | Jakubowski | | |
| 2011/0099233 A1 | 4/2011 | Calder et al. | | |
| 2011/0145413 A1 * | 6/2011 | Dawson et al. | | 709/226 |
| 2011/0153656 A1 * | 6/2011 | Sundstrom et al. | | 707/769 |
| 2011/0202641 A1 * | 8/2011 | Kahn et al. | | 709/221 |
| 2011/0225231 A1 | 9/2011 | Bansal et al. | | |
| 2011/0252082 A1 | 10/2011 | Cobb et al. | | |
| 2012/0110186 A1 | 5/2012 | Kapur et al. | | |
| 2012/0147894 A1 | 6/2012 | Mulligan et al. | | |
| 2012/0190458 A1 | 7/2012 | Gerson et al. | | |
| 2012/0209901 A1 | 8/2012 | Xu et al. | | |
| 2012/0226794 A1 | 9/2012 | Calder et al. | | |
| 2012/0226799 A1 | 9/2012 | Kapur et al. | | |
| 2012/0239792 A1 | 9/2012 | Banerjee et al. | | |
| 2012/0311159 A1 | 12/2012 | Bansal et al. | | |

FOREIGN PATENT DOCUMENTS

| | | | |
|---|---|---|---|
| KR | 10-2003-0094163 A | 12/2003 | |
| KR | 10-2006-0064503 A | 6/2006 | |
| WO | WO 2009/101414 A2 | 8/2009 | |
| WO | 2009/149967 | 12/2009 | |
| WO | WO 2009149967 A1 * | 12/2009 | H04L 29/08 |

OTHER PUBLICATIONS

Open Mobile Alliance, Generic Content Download over the Air Specification, Version 1.0 (Announcement Open Mobile Alliance), Jun. 20, 2002, pp. 1-40, XP002264099.

International Search Report and Written Opinion dated Nov. 24, 2011 for International PCT Application No. PCT/US2011/031552, 11 pages.

U.S. Appl. No. 13/441,812, Final Office Action mailed Dec. 24, 2012, 18 pages.

Elizondo, J., et al. "Edge-Based Cloud Computing as a Feasible Network Paradigm," Department of Computer Science University of Texas at Austin, Dec. 4, 2009, 8 pages.

U.S. Appl. No. 13/441,812, First Action Interview Pilot Program Pre-Interview Communication mailed Jun. 6, 2012, 4 pages.

Extended European Search Report mailed on Sep. 19, 2013 in EP 11766718, 58 pages.

U.S. Appl. No. 13/950,213, Non-Final Rejection mailed on Apr. 11, 2014, 7 pages.

* cited by examiner

| Publisher | Site | Encoding Profiles | Advertising Index |
|---|---|---|---|
| Company A | companyA.sports.com | E1, E2, E3 | ID1, ID2, ID4 |
| Company A | companyA.news.com | E5, E6, E9 | ID2, ID5, ID17 |
| Company B | companyB.com | E1-7 | ID3, ID5, ID16 |
| Company C | companyC.com | E2-5, E17, E23 | ID1, ID2, ID15, ID27 |
| ⋮ | ⋮ | ⋮ | ⋮ |

*FIG. 3*

| Profile | Codec | Container | Frame size | Bit rate | Description |
|---|---|---|---|---|---|
| E1 | QT | MPEG2 | 480x369 | 900 kbps | Mobile, high bitrate, streaming |
| E2 | H.264 | 3GP | 480x320 | 124 kbps | Streaming |
| E3 | MP3 | MP3 | --- | 64 kbps | Podcast |
| LCD | MPEG4 | 3GP | 176x144 | 100 kbps | Generic mobile device |
| ⋮ | ⋮ | ⋮ | ⋮ | ⋮ | ⋮ |

*FIG. 4*

| Object | Processed | Profiles | UURL |
|---|---|---|---|
| homerun.mpg | 3.16.09 | E1, E2, E3 | http://company.x/sports/homerun.mpg |
| interview.mov | 3.18.09 | E4, E6 | http://company.x/news/interview.mov |
| popvideo.wmv | ... | E1-5, E9-12 | Pending... |
| ⋮ | ⋮ | ⋮ | ⋮ |

*FIG. 5*

| DeviceID | Processor | Screen size | Color Depth | OS | Media/Codecs | Media Delivery Protocol | Media Orchestration Scheme |
|---|---|---|---|---|---|---|---|
| Blackberry Bold 9000 | 624 MHz | 480x320 | 65k | Blackberry OS | H.263, H.264, 3GP, MP3, AAC, ... | RTSP | RSDH |
| Blackberry Storm 9550 | 528 MHz | 480x360 | 65k | Blackberry OS | MPEG4, H.263, H.264, 3PG, MP3, AAC, ... | RTSP | RSDH |
| iPhone/OS 2.x | 600 MHz | 480x320 | 16M | iPhone OS 2.x | H.264, MPEG-4, AAC, ... | HTTP, RTSP | HPD |
| iPhone/OS 3.x | 600 MHz | 480x320 | 16M | iPhone OS 3.x | H.264, AAC, ... | HTTP, RTSP | IHS |
| HTC Nexus One | 1000 MHz | 480x800 | 16M | Android 2.1 | H.264, AAC, MPEG4 | RTSP | RSD |
| Unknown | -- | 320x240 | 256 | -- | H.263, MP3 | HTTP | RSD |
| ••• | ••• | ••• | ••• | ••• | ••• | ••• | ••• |

*FIG. 6*

SYSTEM AND METHOD FOR DELIVERY OF CONTENT OBJECTS

CROSS-REFERENCE TO RELATED APPLICATION

This application claims priority to Australian Patent Application Serial No. 2010201379 filed Apr. 7, 2010, which is incorporated herein by reference in its entirety.

BACKGROUND

The demand for network-based content, particularly audio/video content, has increased dramatically in recent years. Along with the increasing demand, different devices and technologies have emerged which can be used to access such content. Increasingly, these devices are not traditional desktop or laptop computers; they are handheld devices, mobile phones, internet-connected television sets, and other non-traditional devices, with widely varying capabilities. This confluence of events may present challenges to publishers who wish to distribute their content inexpensively, remain up-to-date with the latest technology, and ensure a satisfying experience for their customers.

BRIEF SUMMARY

Techniques for delivering content to an end user device are disclosed. A policy server performs an ingest process in which multiple versions of a content object are created. The multiple versions of the content object are associated with a single network identifier which can be distributed to publishers of the content object. When the content object is requested using the single network identifier, the policy server determines a preferred version from among the multiple versions for delivery to an end user device based on several criteria. The policy server may thereafter orchestrate delivery of the preferred version of the content object to the end user device. The single network identifier may be associated with an edge location in a content delivery network (CDN) and the policy server may orchestrate delivery in cooperation with servers at the CDN edge location.

According to one embodiment, a method of delivering content objects to an end user device comprises receiving notification at a policy server that a content object is available for processing. The method comprises associating a single network identifier with a plurality of versions of the content object, where each version of the content object has a corresponding encoding profile in a set of encoding profiles. The method further comprises sending the network identifier to a publisher of the content object and receiving a request for the content object, where the request includes the network identifier and request information. The method further comprises determining a preferred version of the content object for distribution to the end user device based on the set of encoding profiles and the request information and determining a delivery orchestration scheme by which to send the preferred version of the content object to the end user device. The method comprises sending the preferred version of the content object to the end user device in accordance with the delivery orchestration scheme.

In another embodiment, a policy server comprises a publisher interface, a content request interface, a merge processor, and a policy engine. The publisher interface receives notification that a content object is available for processing. The merge processor associates a single network identifier with a plurality of versions of the content object, each version of the content object being created with a corresponding encoding profile in a set of encoding profiles. When the plurality of versions of the content object is available for distribution, the merge processor provides the network identifier to the publisher interface for delivery to a publisher of the content object. The content request interface receives an HTTP (hyper-text transport protocol) request for the content object using the network identifier and request information relating to capabilities of an end user device. The policy engine determines a preferred version of the content object for distribution to the end user device based on the encoding profiles and the request information. The policy engine also determines a delivery orchestration scheme including a delivery protocol and causes the preferred version to be sent to the end user device in accordance with the delivery orchestration scheme.

In an additional embodiment, a method of distributing content objects in a content delivery network (CDN) is disclosed. The method includes receiving notification at a policy server that a content object is available for processing and, in response to receiving the notification, creating a plurality of versions of the content object with a plurality of corresponding encoding profiles. The method also includes associating the plurality of versions of the content object with a single network identifier of the CDN and sending the network identifier from the policy server to a publisher of the content object. The method also includes receiving a request for the content object comprising the CDN network identifier and request information and determining device capabilities of the end user device based on the request information. The method includes sending the preferred version of the content object to the end user device from a CDN location corresponding to the CDN network identifier.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 3 shows exemplary publisher information.

FIG. 4 shows exemplary encoding profiles.

FIG. 5 shows exemplary information relating to versions of a content object.

FIG. 6 shows exemplary device capabilities information.

In the figures, similar components and/or features may have the same reference label. In some cases, components of the same type are identified by following a first reference label with a dash and a second reference label that further distinguishes among the similar components. If only the first reference label is used, the description is applicable to any of the similar components designated by the first reference label.

DETAILED DESCRIPTION OF EMBODIMENTS

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Figure 1:
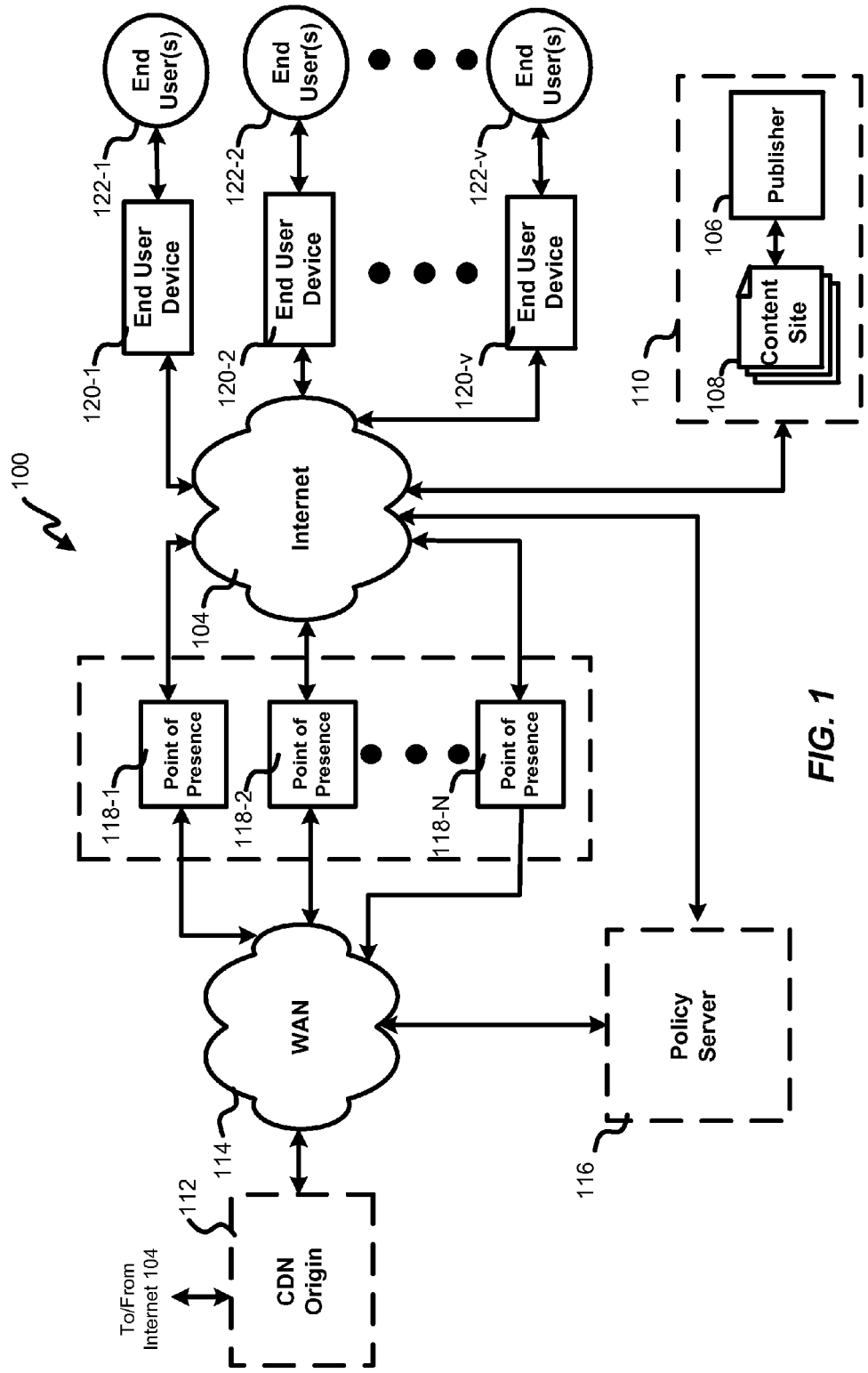
FIG. 1 shows an embodiment of a content distribution system.

Referring first to FIG. 1, a block diagram of an embodiment of a content distribution system 100 is shown in which a content originator 110 offloads delivery of content objects to a content delivery network (CDN). The content originator 110 produces and/or distributes the content objects and may include one or more publishers 106 and content sites 108. The CDN delivers the content objects over the Internet 104 to end users 122 via corresponding end user devices 120.

As shown, the CDN may include an origin server 112, a policy server 116, and various points of presence (POPs) 118. POPs 118 can be deployed throughout content distribution system 100 and may serve content objects to end user devices 120 in a particular geographic area and/or in connection with a particular service provider. For example, a POP 118 may be designated to serve content objects over Internet 104 to end users 122 in a particular city, on a particular access network, etc. to promote efficient delivery and a good user experience. The various CDN elements may be connected by a private network such as WAN 114 and/or a public network such as Internet 104.

An end user 122 may browse for content objects at a content site 108 with its respective end user device 120. As used herein, a content object can be any computer-accessible content and preferably includes audio data, video data, and images in any number of computer-accessible formats. The terms content and content object may be used interchangeably wherever they appear. End user systems 120 can include personal computers, media players, handheld computers, Internet appliances, smart phones, personal digital assistants, streaming radios, or any other device that receives and processes content objects. The content site 108 could be a web page from which content is accessible via a web browser.

Links to content at the content site 108 may point to locations in the content delivery network. When an end user requests delivery of a particular content object, the request may be assigned to a POP 120 which, in turn, can deliver the requested content object to the end user device 120. If the content object is not available at the assigned POP location, the request may be propagated toward the core of the CDN and may ultimately be fulfilled from origin server 112. Content may be cached at various points between the core CDN and edge locations to improve efficiency.

Distribution of content objects often represents an important source of revenue for publishers 106. For example, content sites 108 may generate advertising revenue based on the number of times that a content object is viewed, clicked, or downloaded by end users 122. Thus, to maximize their revenue, publishers 106 may seek to reach as many end users 122 with their content as possible while providing a good overall user experience.

Unfortunately, end user systems 120 can vary widely in their respective capabilities and the manner in which they interact with content objects. Different end user systems 120 may support different collections of multimedia formats and different delivery schemes. For example, beginning with OS version 3.0, the iPhone™ from Apple, Inc. supports M3U8 playlists and MPEG-2 segmented video with iPhone™ HTTP Streaming (IHS) delivery, entirely over HTTP (Hypertext Transfer Protocol). On the other hand, the Blackberry Storm™ from Research in Motion, Ltd. supports playback of multimedia content in Third Generation Partnership Project (3GPP) format, over RTSP (Real-Time Streaming Protocol).

To further complicate matters, the manner in which delivery of a content object is initiated may vary from device to device. For example, some end user devices 120 may need help orchestrating a browser-to-player (B2P) handoff for certain types of content objects. Moreover, even when media formats and delivery methods are equally supported, the manner in which a content object is delivered may depend on the type of connection to Internet 104 available to the end user device 120 at a particular place and time. Thus, for example, the playback capabilities of the Blackberry Storm™ may differ depending upon whether it is connected to the Internet 104 via a WIFI connection in a cybercafé, or via a cellular network in a remote location.

In the present embodiment, policy server 116 is coupled to content site 108 via Internet 104 and receives a notification when new content objects are available from publishers 106. Alternatively, a publisher 106 may upload its content to an origin server 112 and policy server 116 may receive notifications via WAN 114 when a new content object becomes available. Although shown separately, policy server 116 may be located within POPs 118, origin server 112, or other parts of the content delivery network. Also, it will be recognized that the various operations of policy server 116 may be carried out by multiple individual servers such as decisioning servers, merge servers, assembly servers, etc.

When a new content object is ready for processing, policy server 116 determines how it should be made available to end users. This may involve generating a number of different versions of the content object optimized for use with different end user devices 120, having different capabilities, and potentially used in different network environments. The different versions of the content object may correspond to different production or encoding profiles maintained at policy server 116. The production profiles, in turn, may be based upon a publisher's requirements for the distribution of its content objects. For example, a publisher may prefer to distribute its content in a specific media format or formats, to exploit device-specific capabilities (such as IHS streaming for iPhones), to optimize separately for high bitrate and low bitrate environments, to target specific operating systems and/or platforms such as Windows™ or Mac OS, etc.

Policy server 116 may associate the different versions of a content object with a single network identifier such as a uniform resource locator (URL). The single network identifier can then be returned to the publisher 106 which created the content. The publisher 106 can add the network identifier to one or more content sites 108 which are accessible to end users 122. When a request for the content object is received from an end user device, it can be sent to policy server 116 for analysis. Using all available information, policy server 116 can determine a preferred version of the content object for the end user device and can orchestrate its delivery to the requesting end user. The preferred version and delivery method can be customized for hardware and software capabilities of the end user device, bandwidth and connection quality, viewing habits, user preferences, or any combination of factors. The preferred version may also include a selection of advertisements which are matched to information about the end user device and/or the end user.

As described herein, policy server 116 provides publishers 106 with a one-to-many approach to optimized content delivery. Specifically, a single network identifier can point to multiple versions of a given content object from which policy server 116 selects a preferred version for use with a particular end user device. Policy server 116 thus relieves publishers 106 of the burden of staying up-to-date with technology. When a new platform emerges or device capabilities change, appropriate versions of the content object can be made available to end users 122 through an existing network identifier without further effort from the publisher 106. Policy server 116 determines the preferred version of a content object in a manner that is transparent to the end user and thus avoids complicated configuration, specialized software, or manual selection. The end user experience is further improved by selecting a delivery method and sending the preferred version of the content object from a POP 118 location with a fast response time for the user's location, network access, etc.

Figure 2:
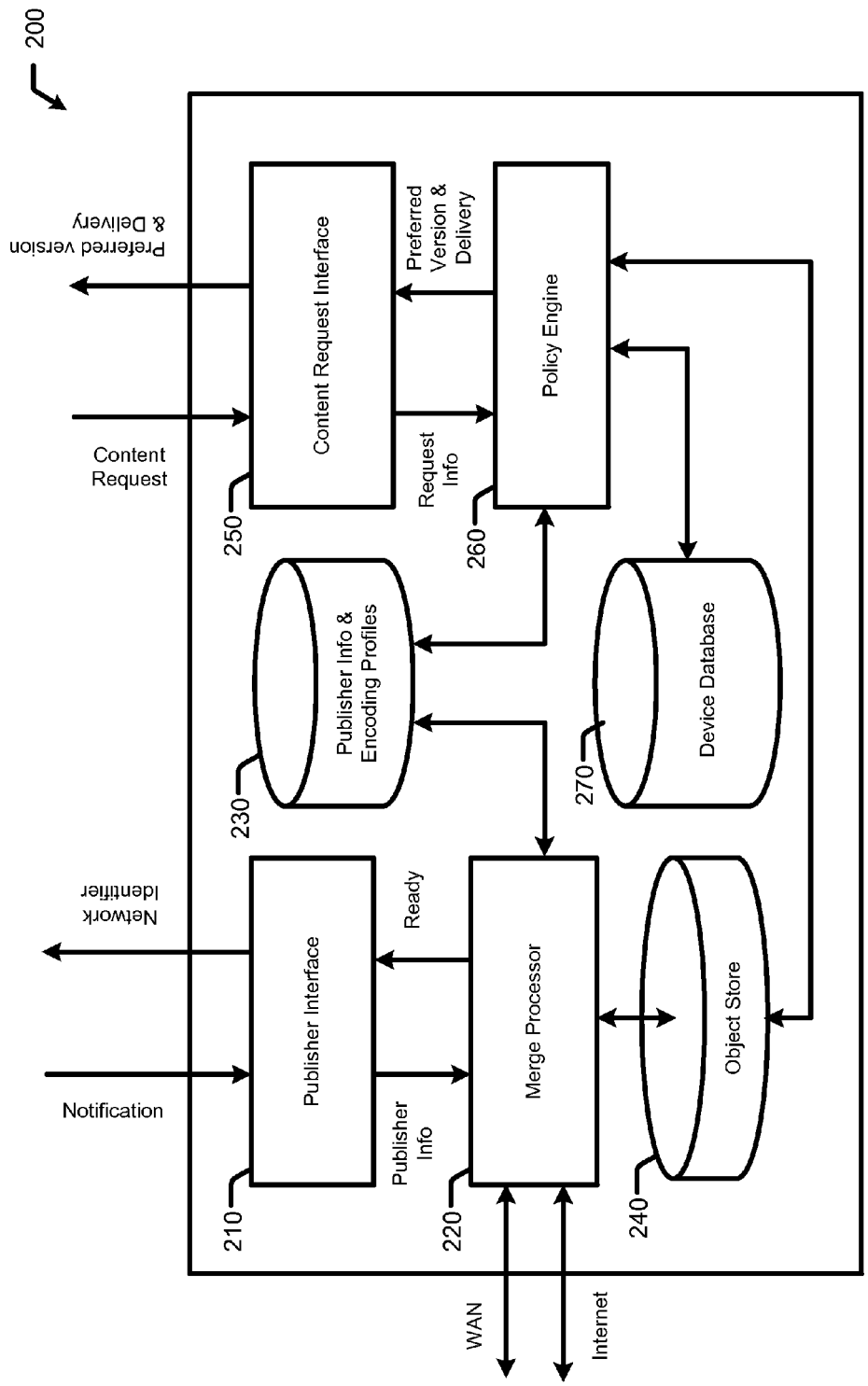
FIG. 2 shows an embodiment of a policy server.

FIG. 2 shows one embodiment of a policy server 200. The present embodiment can be as described in connection with policy server 116 and may be situated within a POP 118, an origin server 112, or at some other location within the content distribution system 100 of FIG. 1. Policy server 200 may include one or more hardware processors. In various embodiments, policy server 200 also includes computer-readable media having encoded thereon data elements and program instructions which, when executed by the one or more processors, cause the policy server 200 to carry the operations described herein.

Figure 8:
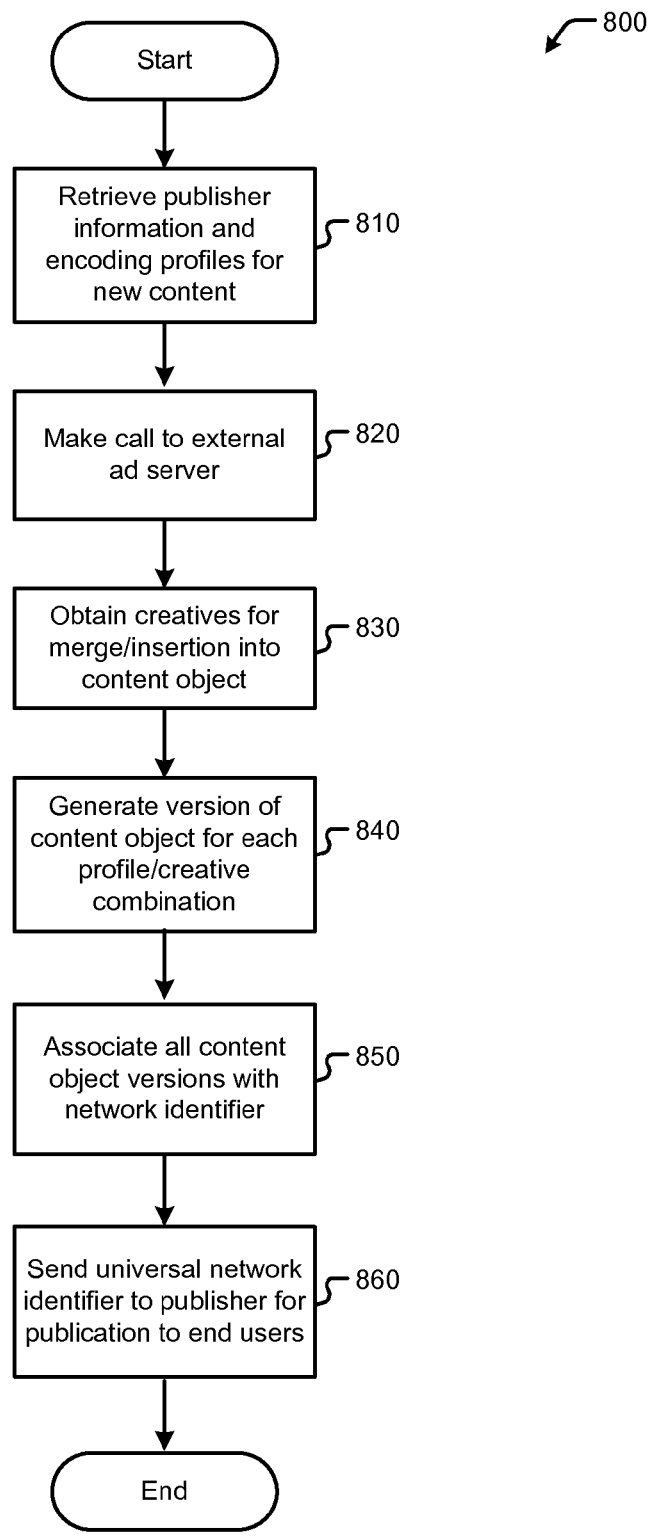
FIG. 8 shows an exemplary ingest process.
Figure 9:
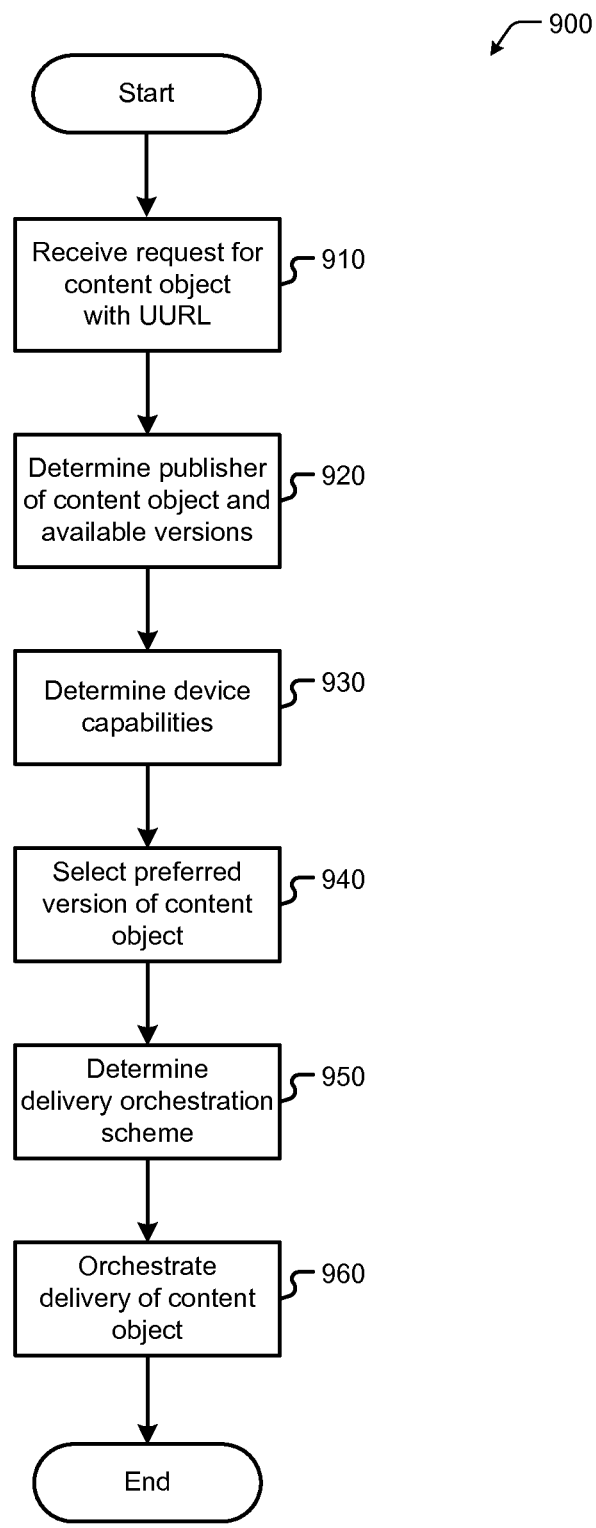
FIG. 9 shows an exemplary delivery process.

FIGS. 3, 4, 5, and 6 illustrate some exemplary data elements such as may be tangibly recorded on computer readable media accessible to policy server 200. FIGS. 8-9 depict exemplary processes such as may be carried out by the one or more processors of policy server 200 executing program instructions stored on such computer-readable media. Computer readable media suitable for storing the data and program instructions may include magnetic storage media including hard disk drives, optical storage media including optical discs, solid state storage including flash-memory devices, and the like.

A publisher interface 210 of policy server 200 receives notification that a content object is available for processing. The notification can be any type of network communication and may be received directly from a publisher or from a CDN location. For example, a publisher 106 may use an RSS (Really Simple Syndication) feed to signal that new content objects are available for processing. Alternatively, the notification may be an event such as an AMQP (Advanced Message Queuing Protocol) message received over WAN 114 when new content is added to a file system of origin server 112, or other type of network communication.

When a notification is received, publisher interface 210 can provide information about the publisher and the content object to a merge processor 220. Merge processor 220 retrieves the content object over Internet 104 or wide area network 114 and is configured to create a plurality of versions of the content object. Creating versions of the content object can involve one or more transcoding, converting, splicing, truncating, padding, reformatting, resampling, repackaging, and related operations which may alter the media format and/or other attributes of the content object as originally created by the publisher 106.

Merge processor 220 can create different versions of the content object according to the requirements of each publisher 106. In one embodiment, merge processor 220 determines a set of production profiles with which to create the versions based on information received at publisher interface 210 or maintained at policy server 200. For instance, publishers 106 may specify various encoding parameters for use in creating the different versions of their content. The encoding parameters may be fashioned into profiles and stored at policy server 200.

FIG. 3 shows exemplary publisher data such as can be included in a publisher/profile database 230 of policy server 200. As shown, the publisher data maps various encoding profiles and advertising information to content sites 108. For instance, at the publisher level, Company A may require different encoding profiles and advertisements for use with its content objects than does Company B. In addition, at the site level, Company A may wish to provide the content from its news operations in different media formats and with different advertising material than content from its sports operations.

Using information from publisher interface 210, merge processor 220 may retrieve one or more publisher-specific and/or site-specific entries from database 230 with which to process content objects. In addition, merge processor 220 may make calls to an external entity to obtain advertising material ("creatives") for inclusion with the different versions of the content object based on advertising index values or other indicators. For example, merge processor 220 may be configured to make advertising calls over Internet 104 or WAN 114 to a hosted ad serving platform such as the DART for Publishers service from Google, Inc. or the Atlas AdManager service from Microsoft Corporation. The advertising calls may include additional publisher-specific indices or category information for matching the creatives to particular content.

FIG. 4 shows exemplary profile information such as can be included in database 230. As shown, each profile includes a collection of information with which to create versions of the content object. For example, among other things, each profile may include a codec, a container type, a frame size, a bit rate, a color depth, an audio format, etc. These and other parameters may be optimized for use by different end user devices 120 under different operating conditions. Collections of encoding profiles can be matched to the capabilities of different end user devices 120 and/or different operating conditions. For example, profiles may be organized in database 230 into collections of iPhone profiles, Blackberry profiles, high-bandwidth profiles, low-bandwidth profiles, etc. Database 230 may also include one or more profiles which are representative of a lowest common denominator (LCD) of the end user devices 120 or of a particular category of end user devices, such as a generic mobile device profile.

When encoding profiles for a content object have been identified and the creatives are ready, merge processor 220 produces a plurality of versions of the content object. This can involve inserting creatives at different positions in the content object and generating versions of the content object having different combinations of creatives for each encoding profile. In some embodiments, a plurality of merge resources work in parallel to create versions of the content object for each profile-creative combination. For example, merge processor 220 may direct the operation of a server farm or cluster of computing resources in the large scale production of versions of the content object. As they become available, the content object versions may be placed into an object store 240 and readied for distribution to locations throughout the CDN.

Merge processor 220 associates each version of the content object with a single network identifier and, when processing of the content object is complete, may signal to publisher interface 210 that the network identifier is ready for distribution. Policy server 200 may then transmit the network identifier to publishers 106 for use at content sites 108. As described below, information about the network identifier is maintained in database 230 and used by a policy engine 260 to determine a preferred version of the content object for distribution to an end user system.

FIG. 5 shows exemplary network identifiers such as may be created by merge processor 220 and stored in database 230. Here, the network identifiers are universal-URLs (UURL). A universal-URL is a single URL that is associated with all versions of the content object available for distribution to end user devices. For example, all versions of the content object "homerun.mpg" (which may include versions created using encoding profiles E1, E2, and E3 with different combinations of creatives) are referenced by the single network identifier "http://company.x/sports/homerun.mpg." The various versions of content object "interview.mov" are referenced by network identifier "http://company.x/news/interview.mov," and so on.

When an end user 122 requests delivery of a content object using its UURL, the request may be redirected to policy server 200 for selecting a preferred version of the requested content object from the available versions and for orchestrating delivery of the preferred version to the end user device. For example, the content request may be received at a POP 118 location in the CDN and redirected to policy server 200 using HTTP redirects. CDN elements may also forward information relating to the request ("request information") with the UURL for use by policy server 200. Request information may include cookies, usage statistics, user profiles, hardware identifiers, software identifiers, demographics information, viewing habits, content preferences, group memberships, etc. The content request interface 250 receives the request information and passes it along with the UURL to a policy engine 260.

Policy engine 260 is responsible for understanding the content and determining how to orchestrate a response to ensure its proper delivery to the requesting end user device. Using the network identifier, policy engine 260 can retrieve information from database 230 about the publisher of the requested object, the versions of the content object available for delivery through the CDN, and their corresponding encoding profiles and creatives. Using the request information, policy engine 260 can select a preferred version of the content object for the end user device and can determine an appropriate delivery scheme.

The request information may include a user-agent associated with the end user device. The user agent, for example, may include one or more hardware and/or software identifiers corresponding to device capabilities. For purposes of illustration, two examples of user agent information are provided below.

(1) BlackBerry9530/4.7.0.148 Profile/MIDP-2.0 Configuration/CLDC-1.1 VendorID/105
(2) Mozilla/5.0 (iPhone; U; CPU iPhone OS 3_0_1 like Mac OS X; en-us) AppleWebKit/525.18.1 (KHTML, like Gecko) Mobile/5H11

The first example (1) shows user agent information for a Blackberry mobile phone. The device is identified as a Model 9530 running version 4.7.0.148 of the browser software. The user-agent information also indicates that the device supports Java application programming interfaces (CLDC-1.1) and includes a Vendor string (VendorID/105) indicating that "Verizon US" is the wireless provider. The second example (2) shows user-agent information for an iPhone. The hardware is identified as an iPhone mobile device with firmware version 5H11. Software capabilities indicate the iPhone is running version 3.0.1 of the iPhone OS, with build 525.18.1 of AppleWebkit core classes and a Mozilla-based browser.

In addition to user-agent information, policy engine 260 may also receive metadata, cookies, profiles, or other device/user information from content request interface 250. Cookies and metadata, for example, may be forwarded to policy server 200 from the CDN server where the request was received and may contain indications of user preference for one media format or another, viewing history, etc. Based on the totality of available information, policy engine 260 determines a preferred version of the content object and an orchestration scheme for arranging its delivery to the requesting end user device.

FIG. 6 shows exemplary device information such as may be included in device database 270 and used by policy engine 260 to determine a preferred version and delivery orchestration scheme for responding to a content request. Device database 270 can include extensive details of hardware and software capabilities corresponding to a number of end user devices. For example, as shown, the device capabilities information can include processor, display screen, operating system, codec, protocol, and B2P handover information for each device. Information for populating device database 270 may be obtained directly from manufacturers and deduced from publicly available sources and may be updated as new devices and technologies appear in the marketplace.

Using the publisher information (FIG. 3) in combination with network identifier information (FIG. 5), and device capabilities information (FIG. 6), policy engine 260 can determine a preferred version of a requested content object from among the available versions. For example, if a user requests UURL "http://company.x/sports/homerun.mpg," policy engine 260 may determine that the requested object is an asset of Company X and that three versions (E1, E2, E3) of the content object are available for distribution through the CDN. Policy engine 260 can then cross-reference device capabilities with the encoding profiles to identify a subset of the available versions best suited for use with the requesting end-user device. The subset of versions can then be ranked in accordance with the request information and publisher requirements to identify the preferred version based on the best information available.

In the "homerun.mpg" example, if the user-agent information indicates that the end user device is an iPhone™, the preferred version may correspond to encoding profile E1 since that profile matches the 480×360 native resolution of the iPhone™ device and includes a (segmented) MPEG-2 video format. Since the requesting device has identified itself as an iPhone™, policy engine 260 could select an HPD delivery orchestration scheme. However, because it is known that the requesting iPhone™ is also running OS 3.x, the device capabilities information indicates that iPhone™ HTTP Streaming (IHS) is also available.

IHS delivery may be preferred by the publisher, it may match the end user's preferences, or it may represent the default orchestration scheme for iPhones running OS 3.x. Continuing with the example, policy engine 260 may select as the preferred version of "homerun.mpg" one that is created with encoding profile E1 and that includes a selection of creatives based on the request information. Note that the version of the content object selected as the preferred version and the delivery orchestration scheme may change based on the hardware and software capabilities of the requesting device. For example, if an iPhone™ is detected as running version 2.x of the Apple operating system, policy engine 260 may instead choose HPD orchestration and a version of the content object having an MPEG-4 video format.

Of course, many variations are possible in determining the preferred version and delivery orchestration scheme. For example, the request information may include a type of connection for the end user device. The type of connection may be determined based on information received from the end user device, based on an IP address of the end user device, based on an entry point to the CDN, or any other means and may influence orchestration and the selection of the preferred version. In a simple case, the type of network connection may be used to choose between high bit rate and low bit rate versions of the content object. Cookies and metadata included with the request information may also influence selection of the preferred version of the content object. For example, cookies may provide an indication of user preference for media formats, bit rates, playback software, etc.

In some embodiments, policy engine 260 may determine a preferred version of the content object according to a hierarchy of information. For example, in descending order of priority, the hierarchy may include user preferences, special hardware capabilities, general hardware capabilities, special software capabilities, general software capabilities, and default settings. Policy engine 260 may perform a series of comparisons using available information and a predetermined order of precedence by which to identify the preferred version of the content object.

As one example, a user's preference for MOV media format with a QuickTime media player may take precedence over generalized software capabilities and default settings. Similarly, versions of a content object which exploit special hardware capabilities, such as high resolution display screens, may be preferred to versions compatible with more general hardware capabilities; specialized software capabilities (such as IHS streaming support) may take precedence over default HTTP delivery, and so on. Operation of policy engine 260 is not limited to a particular set of information, but may utilize any combination of user, publisher, network, encoding profile, and device capabilities information by which to determine a preferred content version and by which to orchestrate its delivery to the end user.

Figure 7:
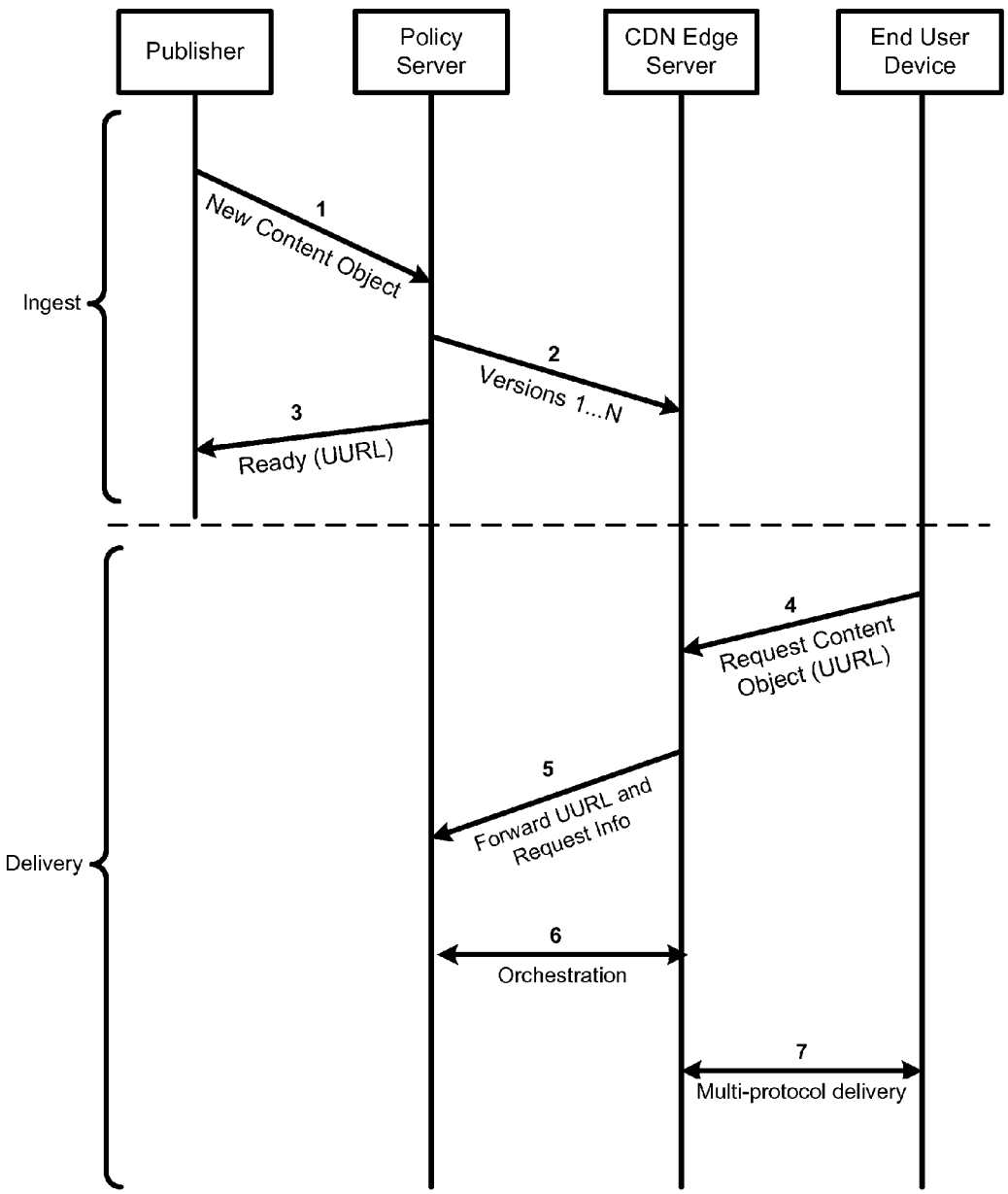
FIG. 7 shows an interaction between elements of a content distribution system.

FIG. 7 shows an exemplary interaction among elements of a content distribution system including a publisher, a policy server, a CDN edge server, and an end user device. The elements participating in exemplary interaction may be as described in connection with the content distribution system 100 of FIG. 1, including the policy server 200 of FIG. 2. For purposes of discussion, the interaction is divided into an ingest part (arrows 1-3) and a delivery part (items 4-6). The ingest part of the interaction begins at arrow (1) when the policy server receives notification of a new content object and is now described in connection with FIG. 8.

FIG. 8 shows an exemplary ingest process 800 such as may be performed by policy server 200 at this stage of the interaction. Some or all of ingest process 800 may be performed by one or more processors executing fixed or programmable instructions which, in turn, may be stored with related data elements on a computer-readable medium.

At block 810, the policy server retrieves publisher information and encoding profiles for the new content object. The publisher information may be similar to that described in connection with FIG. 3 and may specify a set of encoding profiles and advertising identifiers such as shown in FIG. 4 for processing the media assets of a particular content site.

At block 820, the policy server uses the advertising identifiers to communicate with ad servers. For instance, the policy server may transmit the advertising identifiers and other information specific to the content site to one or more ad servers using their respective application programming interfaces (API). Based on the responses from the ad servers, at block 830, creatives are obtained for inclusion with new versions of the content object. With audio and video content, the response to the ad call may also include information to guide placement of the creatives within the content object. For example, different types of creatives may be designated for insertion at pre-roll, mid-roll, and post-roll positions in the content object received from the publisher.

At block 840, the policy server generates, or causes to be generated, a plurality of versions (1 . . . N) of the content object. The versions may be created by transcoding, converting, merging, splitting, truncating, padding, resampling, resizing, reformatting, repackaging, filtering, and otherwise transforming and possibly modifying the original content object according to the collection of encoding profiles associated with publisher and content site. During processing, advertising material can be inserted or merged into each version of the content object at the specified positions and, for each encoding profile, versions may be created using different combinations of advertising material. Note that the N versions of the content object may be created in a parallel fashion and that processing may be distributed across a collection of merge computing resources to minimize the time to completion.

At block 850, the policy server associates the N versions of the content object with a single network identifier. The network identifier can be, for example, a universal URL (UURL) as described in connection with FIG. 5, or other identifier having a one-to-many relationship to the versions of the content object. When the versions of the content object are ready, at block 860, the policy server may distribute them to locations in the CDN such as origin servers 112 or, in some cases, to various POP locations as shown by arrow (2). The ingest part ends when the policy server returns the network identifier to the publisher for inclusion on its content sites as shown with arrow (3). However, additional versions of the content object may be generated as new hardware and software capabilities emerge or when a publisher's requirements change. Because the additional versions are associated at the policy server with a previously published network identifier, updates to the respective content sites are not required.

The delivery part of the interaction begins with arrow (4) when the end user device requests a content object using the network identifier (UURL) and is now described in connection with FIG. 9.

FIG. 9 shows an exemplary delivery process 900 such as may be performed by policy server 200. Some or all of delivery process 900 may be performed by one or more processors executing fixed or programmable instructions which, in turn, may be stored with related data elements on computer-readable media.

At block 910, a request for a content object with a UURL is received. For example, with a UURL, an end user may click on a link at a publisher's web site and be redirected to a nearby CDN location. This can be accomplished through DNS resolution or in some other manner. As shown using arrow (5), the CDN location may forward the content request along with any related information such as the IP address of the end user device, hardware and software identifiers, usage statistics, cookies, metadata, profiles, etc. to the policy server for selection of a preferred version of the requested content.

At block 920, the policy server identifies versions of the content object associated with the UURL. As previously described, a multitude of versions may have been generated during the ingest process and each version may correspond to an encoding profile and a set of creatives. The encoding profiles, in turn, may be optimized for use with different hardware and software platforms under different network conditions, and the creatives may be selected according to the type of content, with different groups of creatives being designated for different target audiences of the content object.

At block 930, the policy server determines capabilities of the requesting end user device. The capabilities may be determined using device identifiers accompanying the content request or other sources of information available through the CDN. For instance, device information may be retrieved from a device capabilities database with information from a user-agent string, cookies stored on the end user's computer, records of previous interactions with the CDN, etc.

At block 940, a preferred version of the content object is selected based on the various sources of information. As shown by arrow (6), the policy server also determines a delivery orchestration scheme, block 950, for sending the preferred version of the content object to the requesting end user. Both the preferred version of the content object and the delivery orchestration scheme selected by the policy server may reflect a ranking of device capabilities, user preferences, publisher requirements, network conditions, and other factors relating to overall user experience of the requested content as these elements are variously described herein.

At block 960, the policy server orchestrates delivery of the preferred version of the content object according to the selected delivery option. As shown by a arrow (7), orchestration may involve multiple delivery protocols. For example, delivery orchestration schemes which may be utilized by the policy server include HTTP progressive download (HPD), RTSP streaming delivery (RSD), RTSP via HTML stub (RSDH), and iPhone HTTP streaming (IHS).

As described below in connection with FIG. 10, orchestration may include, for example, coordinating with other elements of the CDN, redirecting an HTTP content request, transitioning from HTTP to RTSP, providing a stub or helper file, providing a master playlist, providing a bandwidth-specific playlist, or other combination of actions.

Figure 10A:
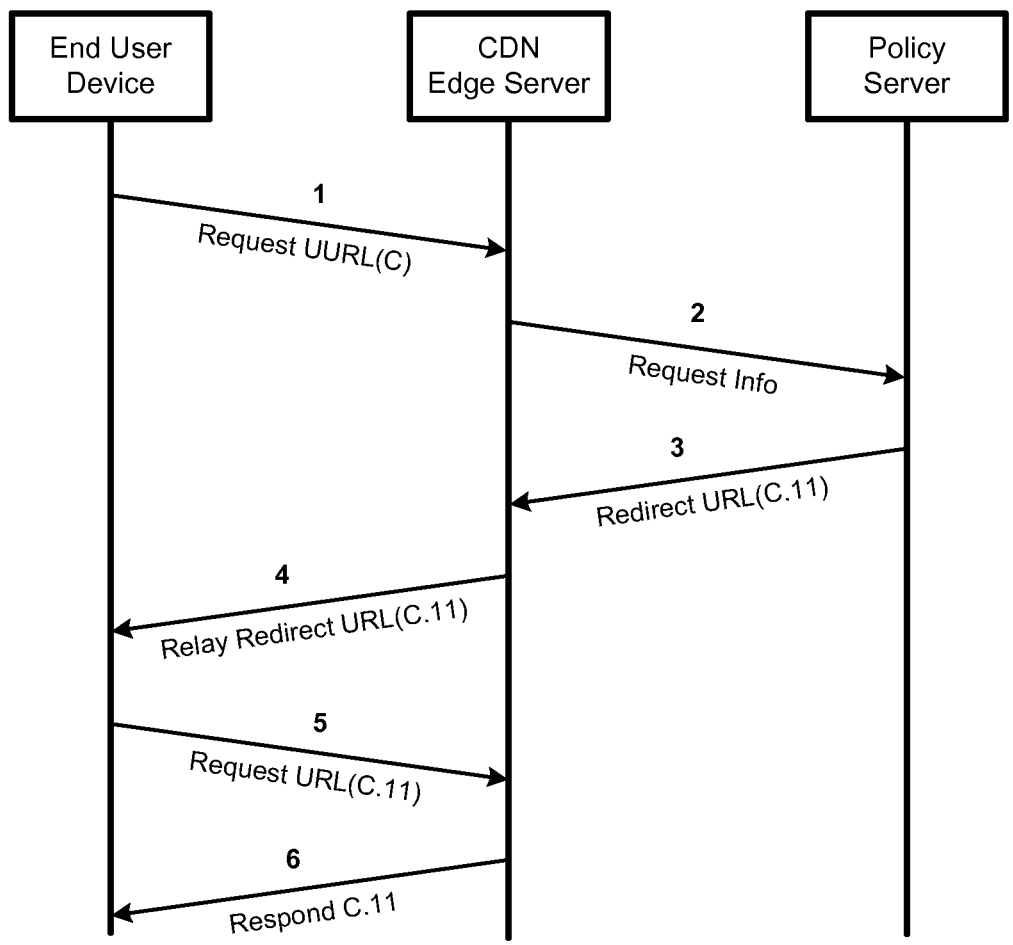
FIG. 10A shows aspects of HPD content delivery.

FIG. 10A shows aspects of an exemplary HPD delivery orchestration scheme involving a policy server, a CDN edge server, and an end user device. The exemplary HPD orchestration scheme may be used by a policy server in the content distribution system 100 of FIG. 1 in response to a request for content.

The interaction begins with arrow (1) when the end user device requests a content object using its universal URL. As shown, the end user device may send an HTTP request for universally-identified content object C. The UURL may resolve to a CDN location that is best able to serve the end user device. At arrow (2), the CDN edge server forwards the HTTP request along with request information such as user profiles, device identifiers, cookies, metadata, network connection, etc. to the policy server.

The policy server processes the UURL request and the additional request information received from the CDN edge server and determines a preferred version (C.11) of the content object for delivery to the end user computer. At arrow (3), the policy server generates an HTTP redirect 302 in which information about version C.11 is added to the location header. At arrow (4), the CDN edge server performs a second HTTP redirect to pass the updated location header to the end user device. The end user device makes a second HTTP request at arrow (5) for content object C.11 using the location header information. The CDN edge server responds to the second HTTP request at arrow (6) and delivers the preferred C.11 version of the content object. In an alternative embodiment, the exchange shown by arrows (4) and (5) is omitted and the edge server responds directly to the end user device with version C.11 of the content object.

Figure 10B:
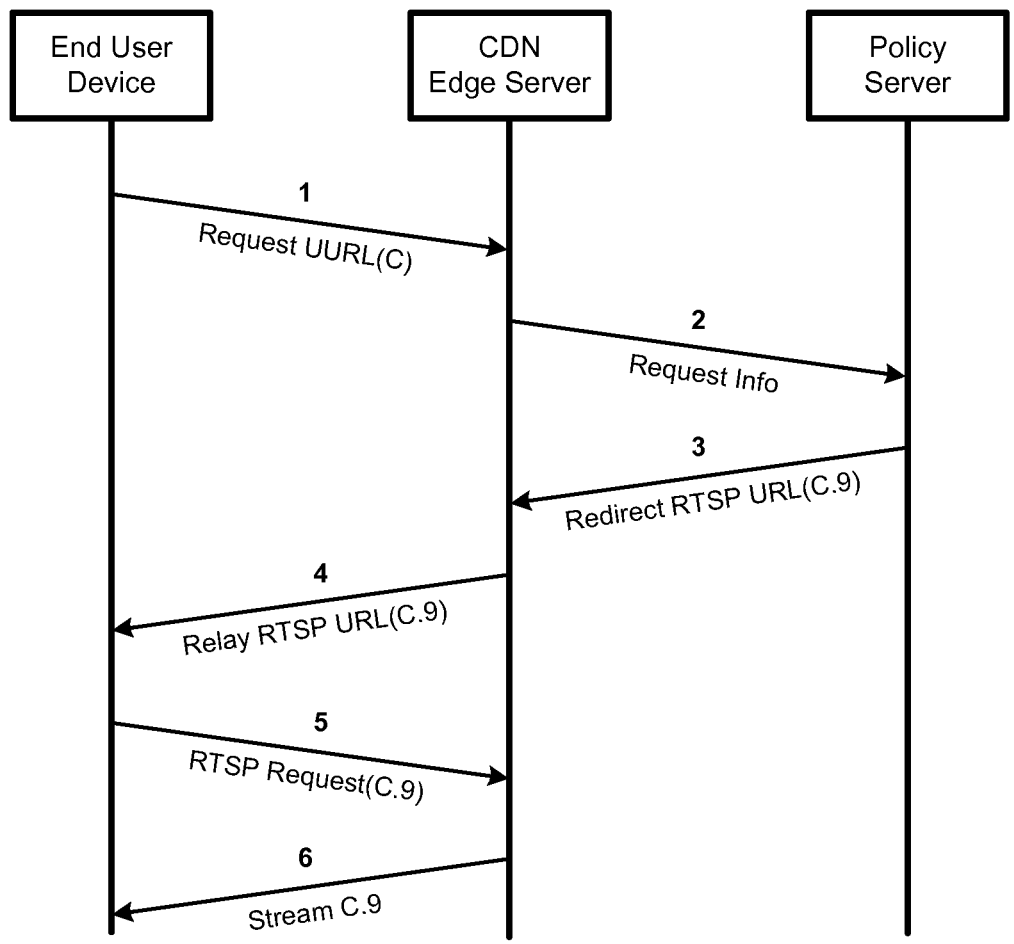
FIG. 10B shows aspects of RSD content delivery.

FIG. 10B shows aspects of an exemplary RSD delivery orchestration scheme involving a policy server, a CDN edge server, and an end user device. The exemplary RSD orchestration scheme may be selected by a policy server in the content distribution system 100 of FIG. 1 in response to a request for content.

The interaction begins with arrow (1) when the end user device requests a content object using its universal URL. As with HPD delivery, the device may send an HTTP request for content object C which may resolve to a CDN point of presence and be assigned to a CDN edge server. At arrow (2), the CDN edge server forwards the HTTP request along with related information such as user profiles, device identifiers, cookies, metadata, connecting network, etc. to the policy server.

The policy server processes the UURL request and any additional information received from the CDN edge server to determine a preferred version (C.9) of the content object for delivery to the end user device. In this case, RTSP streaming delivery is selected. The selection of RTSP delivery may be based on user preferences, publisher preferences, software capabilities, or any number of factors.

At arrow (3), the policy server generates an HTTP redirect (302) in which an RTSP URL corresponding to version C.9 is added to the location header. At arrow (4), the CDN edge server performs a further HTTP redirect by which the updated location header is passed to the end user device. At arrow (5), the end user device makes an RTSP request for content object C.9 using header information from the redirected HTTP request. A streaming CDN edge server responds to the RTSP request at arrow (6) and streams version C.9 of the requested content object to the end user device.

Figure 10C:
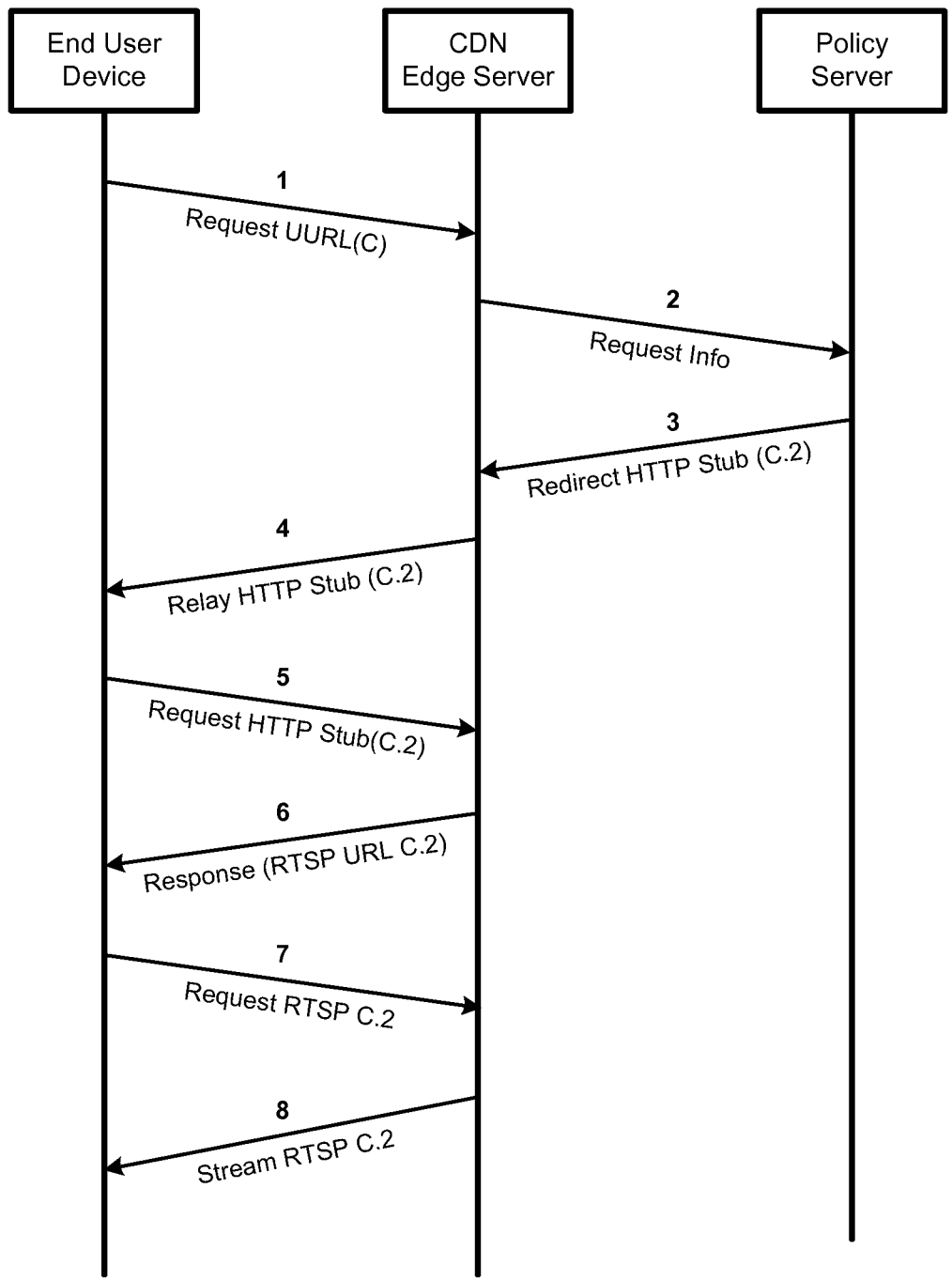
FIG. 10C shows aspects of RSDH content delivery.

FIG. 10C shows aspects of an exemplary RSDH delivery orchestration scheme involving a policy server, a CDN edge server, and an end user device. The exemplary RSDH orchestration scheme may be selected by a policy server in the content distribution system 100 of FIG. 1 in response to a request for content.

The interaction begins with arrow (1) when the end user device requests a content object using its universal URL. The request for content may be an HTTP request which resolves to the address of a CDN edge server. At arrow (2), the CDN edge server forwards the HTTP request along with related information such as user profiles, device identifiers, cookies, metadata, connecting network, etc. to the policy server.

At arrow (3), the policy server generates an HTTP redirect (302) to an HTML stub wrapper. The HTML stub wrapper may include, within its HTML body content, an RTSP URL of the preferred version of the content object and certain directives to force the end user device to invoke a media player application. This type of redirection may be used, for example, to facilitate transition of control from a browsing application to a media player environment when the policy server determines that the end user device lacks the appropriate capabilities.

At arrow (4), the CDN edge server relays the HTTP request referencing the HTML stub wrapper to the end user device. At arrow (5), the end user device makes an HTTP request for the HTML stub wrapper. At arrow (6), the CDN edge server fulfills the request and transfers the HTML stub wrapper to the end user device. The HTML stub wrapper contains the RTSP URL for the C.2 version and causes the end user device to invoke its media player application. At arrow (7), responsive to the HTML stub wrapper, the end user device invokes its media player and requests an RTSP stream for C.2. At arrow (8), a streaming CDN edge server responds to the RTSP request and streams version C.2 of the content object to the end user device.

Figure 10D:
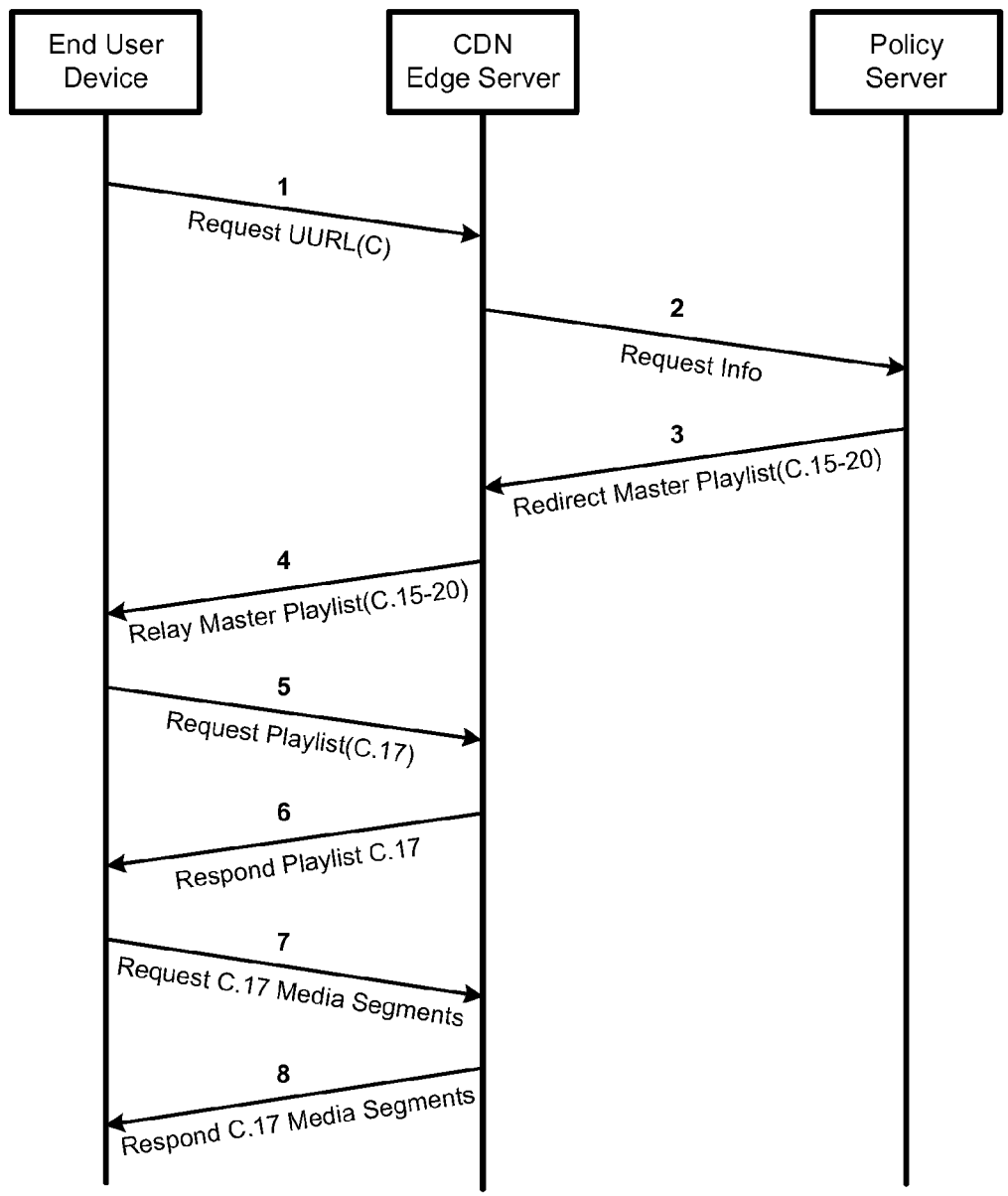
FIG. 10D shows aspects of IHS content delivery.

FIG. 10D shows an exemplary IHS delivery orchestration scheme involving a policy server, a CDN edge server, and an end user device. The exemplary IHS orchestration scheme may be selected by a policy server in the content distribution system 100 of FIG. 1 in response to a request for content.

The interaction begins at arrow (1) when the end user device requests a content object using its universal URL. As with the other delivery methods, the device may send an HTTP request for content object C which is assigned to a CDN edge server through a DNS resolution process. At arrow (2), the CDN edge server forwards the HTTP request along with related information such as user profiles, device identifiers, cookies, metadata, connecting network, etc. to the policy server.

Apple iPhones™ running iPhone OS 3.0 and higher include a built-in Quicktime player which supports streaming video over HTTP using a combination of M3U8 playlists and MPEG-2 segmented video. This approach enables the end user device to select between different versions of a preferred content object (for example, versions with different bitrates) and to switch between the different versions based on how much network bandwidth is available. Due to this flexibility, the policy server may prefer IHS delivery for use with suitable iPhone™ end user devices.

When IHS delivery of preferred content is selected, the policy server generates an HTTP redirect (302) to a master playlist. Here, the master playlist includes references to multiple versions (C.15-C.20) of the preferred content which may, as previously indicated, correspond to multiple bandwidth choices. At arrow (3), the policy server sends the redirected request containing the master playlist to the CDN edge server; at arrow (4), it is returned to the end user device.

At arrow (5), the Quicktime player selects from the master playlist and requests a playlist of media segments corresponding to its selection. In this example, the iPhone™ selects version C.17 from the versions presented in the master playlist and issues a request at item (5) for the C.17 playlist. Version C.17, for example, may represent the highest bandwidth version for prevailing network conditions. At item (6), the CDN edge server responds by providing a playlist for C.17 to the iPhone. Thereafter, during playback of the content, the iPhone requests media segments for C.17 and the CDN edge server delivers the requested segments as is shown by items (7)-(8).

As will be understood by those skilled in the art, the present invention may be embodied in other specific forms. In one particular embodiment of the policy server, a new content object is assigned a single network identifier which, as previously described, can be associated with a plurality of versions of the content object. However, the versions of the content object need not be created prior to receiving a request from an end-user device. Instead, the different versions of the content object may be created dynamically at the direction of the policy server when a request is received. As described herein, the full set of available information (user-agent, preferences, network identifiers, cookies, metadata, usage information, etc) can be utilized to generate a preferred version of the content object for the requesting end-user device. As part of this on-demand process, the newly created preferred version of the content object is associated with the single network identifier previously assigned to the new content object and it may be placed into an object store and used with subsequent requests. Those skilled in the art will recognize, or be able to ascertain using no more than routine experimentation, many equivalents to the specific embodiments of the invention described herein. Such equivalents are intended to be encompassed by the following claims.

What is claimed is:

1. A method of delivering multi-media content objects to an end user device for a single-link player, comprising:
   receiving notification at a hardware policy server that a multi-media content object is available for processing;
   creating a plurality of versions of the multi-media content object in response to the notification and prior to receiving any request for the multi-media content object, each version of the multi-media content object being created with a corresponding encoding profile in a set of encoding profiles;
   associating a unique network identifier with the plurality of versions of the multi-media content object;
   sending the unique network identifier to a publisher hardware server of the multi-media content object;
   receiving a request, at an edge server, for the multi-media content object comprising the unique network identifier and request information relating to capabilities of the end user device;
   determining, at the edge server, a preferred version of the multi-media content object based on the encoding profiles and the request information without further interaction beyond the request, the preferred version being one of the plurality of created versions;
   determining, at the edge server, a delivery orchestration scheme for sending the preferred version of the multi-media content object to the end user device, wherein the delivery orchestration scheme is based on the request information and comprises:
      providing the end user device with an HTTP address of the preferred version, and
      receiving, at the edge server, a request from the end user device with the HTTP address of the preferred version; and
   sending, by the edge server, the preferred version of the multi-media content object to the end user device in response to the request for the multi-media content object in accordance with the determined delivery orchestration scheme with no further information from the end user device beyond the request for the multi-media content object and the request from the end user device with the HTTP address of the preferred version, whereby the single-link player is able to provide the requested content.

2. The method of claim 1, wherein the plurality of versions of the multi-media content object comprise a plurality of audio/video media files.

3. The method of claim 1, wherein each version of the content objects of the plurality of versions of the content objects comprises one or more incorporated third-party advertising materials, the one or more incorporated third-party advertising materials differing across the versions.

4. The method of claim 1, wherein each encoding profile in the set of encoding profiles comprises a plurality of encoding parameters including a bitrate, a frame size, and a media format.

5. The method of claim 4, wherein the encoding parameters are related to end user device capabilities.

6. The method of claim 1, wherein:
   the request information comprises at least one identifier of the end user device;
   the at least one identifier comprises a hardware identifier; and
   the method further comprises:
      determining a display capability of the end user device at the hardware policy server based on the hardware identifier, and determining the preferred version of the multi-media content object based on the display capability.

7. The method of claim 6, wherein the device capabilities comprise a network connection of the end user device, the method further comprising:
determining a bandwidth capability of the end user device based on the network connection; and
determining the preferred version of the multi-media content object based on the bandwidth capability.

8. The method of claim 1, further comprising:
detecting a playback application of the end user device to receive the preferred version of the multi-media content object; and
directing a protocol transition based on the playback application.

9. The method of claim 8, wherein the protocol transition comprises a transition from HTTP to RTSP (real-time streaming protocol) or a transition from HTTP to IHS (iPhone HTTP streaming).

10. A policy server for a single-link player, comprising:
a publisher interface configured to receive notification that a multi-media content object is available for processing;
a merge processor comprising merge resources configured to create a plurality of versions of the multi-media content object in response to the notification and prior to receiving any request for the multi-media content object, each version of the multi-media content object being created with a corresponding encoding profile in a set of encoding profiles, and to associate a unique network identifier with the plurality of versions of the multi-media content object,
the merge processing further configured to provide the unique network identifier to the publisher interface for delivery to a publisher of the multi-media content object when the plurality of versions of the multi-media content object is available for distribution;
a content request interface, at an edge server, configured to receive an HTTP (hyper-text transport protocol) request for the multi-media content object, the request comprising the unique network identifier and request information relating to capabilities of an end user device; and
a policy engine configured to determine, at the edge server, a preferred version of the multi-media content object for distribution to the end user device based on the encoding profiles and the request information, the preferred version being one of the plurality of created versions,
the policy engine further configured to:
determine, at the edge server, a delivery orchestration scheme, wherein the delivery orchestration scheme is based on the request information and comprises:
providing the end user device with an HTTP address of the preferred version, and
receiving, at the edge server, a request from the end user device with the HTTP address of the preferred version; and
cause the preferred version to be sent, by the edge server, to the end user device in response to the request for the multi-media content object in accordance with the determined delivery orchestration scheme with no more information with the end user device beyond the request for the multi-media content object and the request from the end user device with the HTTP address of the preferred version, whereby the single-link player is able to provide the requested content.

11. The policy server of claim 10, wherein each encoding profile in the set of encoding profiles comprises a plurality of encoding parameters including a bitrate, a frame size, and a media format.

12. The policy server of claim 11, wherein the encoding parameters are related to end user device capabilities.

13. The policy server of claim 10, wherein:
the request information comprises at least one identifier of the end user device,
the at least one identifier comprises a hardware identifier, and
the policy engine is configured to determine a display capability of the end user device based on the hardware identifier and to determine the preferred version of the multi-media content object based on the display capability.

14. The policy server of claim 13, wherein the at least one identifier comprises a network connection of the end user device, and wherein the policy engine is configured to determine a bandwidth capability of the end user device based on the network connection and to determine the preferred version of the multi-media content object based on the bandwidth capability.

15. The policy server of claim 10, wherein the policy engine is configured to detect a playback capability of the end user device and to direct a protocol transition based on the playback capability.

16. The policy server of claim 15, wherein the protocol transition comprises a transition from HTTP to RTSP (real-time streaming protocol), and wherein:
the end user device is redirected via HTTP to an RTSP URL (universal resource locator) in connection with the protocol transition; or
the policy server directs delivery of an HTML stub file to the end user device in connection with the protocol transition, said HTML stub file comprising instructions for causing the end user device to receive RTSP content.

17. The policy server of claim 15, wherein the protocol transition comprises a transition from HTTP to IHS (iPhone HTTP streaming).

18. A method of distributing multi-media content objects in a content delivery network (CDN) for a single-link player, comprising:
receiving notification at a policy server that a multi-media content object is available for processing;
creating a plurality of versions of the multi-media content object with a plurality of corresponding encoding profiles responsive to the notification and prior to receiving any request for the multi-media content object, each version of the multi-media content object being created with a corresponding encoding profile in a set of encoding profiles;
associating the plurality of versions of the multi-media content object with a unique network identifier of the CDN;
sending the unique CDN network identifier from the policy server to a publisher of the multi-media content object;
receiving a request, at an edge server, for the multi-media content object, the request comprising the unique CDN network identifier and request information;
determining device capabilities of the end user device based on the request information;
determining, at the edge server, a preferred version of the multi-media content object for the end user device based on the device capabilities, the preferred version being one of the plurality of created versions;

determining, at the edge server, a delivery orchestration scheme for sending the preferred version of the multi-media content object to the end user device, wherein the delivery orchestration scheme is based on the request information and comprises:
  providing the end user device with an HTTP address of the preferred version, and
  receiving, at the edge server, a request from the end user device with the HTTP address of the preferred version; and
sending, by the edge server, the preferred version of the multi-media content object to the end user device from a CDN location corresponding to the unique CDN network identifier in response to the request for the multi-media content object with no more information with the end user device beyond the request for the multi-media content object and the request from the end user device with the HTTP address of the preferred version, whereby the single-link player is able to provide the requested content.

19. The method of claim 18, further comprising:
  determining a delivery orchestration scheme based on the device capabilities; and
  sending the preferred version of the multi-media content object to the end user device using the determined delivery orchestration scheme.

20. The method of claim 18, wherein the request information comprises at least one of device identifiers, usage statistics, cookies, or user preferences associated with the end user device.

21. The method of claim 18, wherein creating the plurality of versions of the multi-media content object comprises adding third-party advertising material to the multi-media content object.

22. The method of claim 21, wherein the third-party advertising material is obtained in response to a call to an internet-based advertising service.

* * * * *